(12) United States Patent
Osako

(10) Patent No.: US 11,959,459 B2
(45) Date of Patent: Apr. 16, 2024

(54) INFORMATION GENERATING DEVICE, INFORMATION GENERATING METHOD AND NON-TRANSITORY COMPUTER-READABLE STORAGE MEDIUM STORING INFORMATION GENERATING PROGRAM

(71) Applicant: Nabtesco Corporation, Tokyo (JP)

(72) Inventor: Haruna Osako, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 17/866,857

(22) Filed: Jul. 18, 2022

(65) Prior Publication Data

US 2023/0027832 A1  Jan. 26, 2023

(30) Foreign Application Priority Data

Jul. 21, 2021 (JP) ................................ 2021-120897

(51) Int. Cl.
*F03D 7/02* (2006.01)
*F03D 15/00* (2016.01)
*F03D 17/00* (2016.01)

(52) U.S. Cl.
CPC ......... *F03D 7/0244* (2013.01); *F03D 7/0204* (2013.01); *F03D 15/00* (2016.05);
(Continued)

(58) Field of Classification Search
CPC ...... F03D 7/0204; F03D 7/0244; F03D 17/00; F03D 17/029; F03D 15/00;
(Continued)

(56) References Cited

U.S. PATENT DOCUMENTS 5,155,375 A * 10/1992 Holley .................... F03D 7/042
290/55
2009/0068013 A1 * 3/2009 Birkemose .............. F03D 7/024
416/31

(Continued)

FOREIGN PATENT DOCUMENTS

EP        2402597 A1    1/2012
EP        3483426 A1    5/2019
(Continued)

OTHER PUBLICATIONS

European Search Report dated Dec. 7, 2022, issued in corresponding European Patent Application No. EP 22185516.6 (8 pgs.).
(Continued)

*Primary Examiner* — Topaz L. Elliott
*Assistant Examiner* — Jesse M Prager
(74) *Attorney, Agent, or Firm* — Pillsbury Winthrop Shaw Pittman, LLP

(57) ABSTRACT

An information generating device includes a control unit for causing a motor to rotate a pinion gear meshing with a ring gear while a predetermined braking force is applied to brake rotation of a turnable part of a wind turbine, thereby causing a fastening part to deform, where the fastening part is provided to fixedly attach the motor to a target part, a deformation amount obtaining unit for obtaining an amount of deformation experienced by the fastening part, and an information generating unit for generating correlation information indicating a correspondence between a driving torque of the motor and the amount of deformation experienced when the driving torque is used to rotate the motor.

17 Claims, 6 Drawing Sheets

(52) U.S. Cl.
CPC ........... *F03D 17/00* (2016.05); *F03D 17/029* (2023.08); *F05B 2260/301* (2013.01); *F05B 2260/80* (2013.01); *F05D 2260/31* (2013.01); *F05D 2260/4031* (2013.01); *F05D 2260/903* (2013.01); *F05D 2270/331* (2013.01); *F05D 2270/335* (2013.01)

(58) Field of Classification Search
CPC ......... F05D 2260/31; F05D 2260/4031; F05D 2270/331; F05D 2270/335; F05B 2260/301; F05B 2260/80; F05B 2260/83; F05B 2270/328; F05B 2270/329; F05B 2270/331

See application file for complete search history.

(56) References Cited

U.S. PATENT DOCUMENTS

| | | |
|---|---|---|
| 2019/0093636 A1 | 3/2019 | Warfen et al. |
| 2019/0203697 A1* | 7/2019 | Nohara ................. F03D 7/0224 |

FOREIGN PATENT DOCUMENTS

| | | | |
|---|---|---|---|
| EP | 3550141 | A1 | 10/2019 |
| EP | 3594492 | A1 * | 1/2020 |
| JP | 2011-145293 | A | 7/2011 |
| JP | 2011-208635 | A | 10/2011 |
| JP | 2013-007600 | A | 1/2013 |
| JP | 2013-238281 | A | 11/2013 |
| JP | 2015-140777 | A | 8/2015 |
| JP | 2017-156265 | A | 9/2017 |
| JP | 2021-102936 | A | 7/2021 |
| KR | 101302671 | B1 | 9/2013 |
| WO | WO-2019185560 | A1 * | 10/2019 ............ F03D 17/00 |

OTHER PUBLICATIONS

Notice of Allowance dated Sep. 27, 2022, issued in corresponding Japanese Patent Application No. 2021-120897 with English translation (4 pgs.).

* cited by examiner

INFORMATION GENERATING DEVICE, INFORMATION GENERATING METHOD AND NON-TRANSITORY COMPUTER-READABLE STORAGE MEDIUM STORING INFORMATION GENERATING PROGRAM

CROSS-REFERENCE TO RELATED APPLICATIONS

This application is based on and claims the benefit of priority from Japanese Patent Application Serial No. 2021-120897 (filed on Jul. 21, 2021), the contents of which are hereby incorporated by reference in their entirety.

TECHNICAL FIELD

The present disclosure relates to an information generating device, an information generating method and a non-transitory computer-readable storage medium storing an information generating program.

BACKGROUND

Wind power generation devices include nacelles. In a wind power generation device, the nacelle utilizes driving torques from one or more yaw drive devices to yaw about the tower (see, for example, Japanese Patent Application Publication No. 2015-140777). The wind power generation devices are required to prevent the yaw drive devices from experiencing overload.

To prevent the yaw drive devices from experiencing overload, it is required to determine the load on the yaw drive devices. For example, the load on the yaw drive devices can be determined by determining deformation of the clamps (fastening bolts) provided to fixedly attach the yaw drive devices to the nacelle and using the determined deformation as an indicator of the load on the yaw drive devices. When the yaw drive devices generate a predetermined driving torque, the amount of deformation may vary among the clamps due to the individual differences between the yaw drive devices and other factors. If the amount of initial deformation varies among the clamps, the correspondence between the driving torque of the yaw drive devices and the amount of deformation experienced by the clamps may not be fixed while the wind power generation devices are in operation. With such variability being present, the load on the yaw drive devices can not be accurately determined based on the driving torque of the yaw drive devices. In order to know such variability in the amount of initial deformation, calibration is required. The calibration can be performed using correlation information indicating the correspondence between the amount of deformation experienced by the clamps and the driving torque of the yaw drive devices.

The wind power generation devices (wind turbines), however, are driven and controlled only by controlling whether to drive or brake the yaw drive devices. For this reason, if one of the yaw drive devices is simply driven while the ring gear is being braked, the driven yaw drive device is overloaded. This may result in breakage of the turning power transmitting portion of the yaw drive device. Considering these, the correlation information indicating the correspondence between the driving torque of each yaw drive devices and the amount of deformation experienced by the corresponding clamp is obtained by a worker going inside the nacelle and manually rotating each yaw drive devices to measure the amount of deformation of the clamp. This approach, however, forces burden on the worker. Therefore, an alternative method is required to enable the correlation information to be obtained remotely.

SUMMARY

An object of the present disclosure is to provide an information generating device, an information generating method and a non-transitory computer-readable storage medium storing an information generating program for remotely generating correlation information indicating the correspondence between the amount of deformation experienced by clamps provided to fixedly attach yaw drive devices to a nacelle and a driving torque produced by the yaw drive devices.

(1) One aspect of the present disclosure provides an information generating device including a control unit for causing a motor to rotate a pinion gear meshing with a ring gear while a predetermined braking force is applied to brake rotation of a turnable part of a wind turbine, thereby causing a fastening part to deform, where the fastening part is provided to fixedly attach the motor to a target part, a deformation amount obtaining unit for obtaining an amount of deformation experienced by the fastening part, and an information generating unit for generating correlation information indicating a correspondence between a driving torque of the motor and the amount of deformation experienced when the driving torque is used to rotate the motor.

The information generating device can generate the correlation information remotely, which indicates the correspondence between the amount of deformation experienced by a clamp used to fixedly attach yaw driving devices to a nacelle (target part) and a driving torque of the yaw driving devices.

(2) In order to brake the turnable part, the control unit may control a braking unit configured to brake relative rotation of the ring gear and the pinion gear.

(3) The motor may include a shaft braking unit for braking a rotatable shaft of the motor. The control unit may control the shaft braking unit to brake the turnable part.

(4) An upper limit of the predetermined braking force may be less than an allowable torque for a weakest one of stiffness of the pinion gear, stiffness of the turnable part, and stiffness of a speed reducing unit of the motor.

(5) The predetermined braking force may be a braking force from a first motor, the motor may be a second motor, and the information generating unit may generate, as the correlation information, correlation information indicating a correspondence between a predetermined driving torque and the amount of deformation experienced when the predetermined driving torque is used to rotate the second motor.

(6) An upper limit of the predetermined driving torque may be less than an allowable torque for a weakest one of stiffness of the pinion gear, stiffness of the turnable part, and stiffness of a speed reducing unit of the second motor.

(7) One aspect of the present disclosure provides an information generating method including steps of causing a motor to rotate a pinion gear meshing with a ring gear while a predetermined braking force is applied to brake rotation of a turnable part of a wind turbine, thereby causing a fastening part to deform, where the fastening part is provided to fixedly attach the motor to a target part, obtaining an amount of deformation experienced by the fastening part, and generating correlation information indicating a correspondence between a driving torque of the motor and the amount of deformation experienced when the driving torque is used to rotate the motor.

(8) An upper limit of the predetermined braking force may be less than an allowable torque for a weakest one of stiffness of the pinion gear, stiffness of the turnable part, and stiffness of a speed reducing unit of the motor.

(9) The predetermined braking force may be a braking force from a first motor, the motor may be a second motor, and, as the correlation information, correlation information may be generated that indicates a correspondence between a predetermined driving torque and the amount of deformation experienced when the predetermined driving torque is used to rotate the second motor.

(10) An upper limit of the predetermined driving torque may be less than an allowable torque of a weakest one of stiffness of the pinion gear, stiffness of the turnable part, and stiffness of a speed reducing unit of the second motor.

(11) One aspect of the present disclosure provides a non-transitory computer-readable storage medium storing an information generating program. The information generating program causes a computer to perform procedures of causing a motor to rotate a pinion gear meshing with a ring gear while a predetermined braking force is applied to brake rotation of a turnable part of a wind turbine, thereby causing a fastening part to deform, where the fastening part is provided to fixedly attach the motor to a target part, obtaining an amount of deformation experienced by the fastening part, and generating correlation information indicating a correspondence between a driving torque of the motor and the amount of deformation experienced when the driving torque is used to rotate the motor.

(12) An upper limit of the predetermined braking force may be less than an allowable torque for a weakest one of stiffness of the pinion gear, stiffness of the turnable part, and stiffness of a speed reducing unit of the motor.

(13) The predetermined braking force may be a braking force from a first motor, the motor may be a second motor, and, as the correlation information, correlation information may be generated that indicates a correspondence between a predetermined driving torque and the amount of deformation experienced when the predetermined driving torque is used to rotate the second motor.

(14) An upper limit of the predetermined driving torque may be less than an allowable torque for a weakest one of stiffness of the pinion gear, stiffness of the turnable part, and stiffness of a speed reducing unit of the second motor.

The present disclosure can generate the correlation information remotely, which indicates the correspondence between the amount of deformation experienced by the clamp used to fixedly attach the yaw driving devices to the nacelle and the driving torque of the yaw driving devices.

DESCRIPTION OF THE PREFERRED EMBODIMENTS

Embodiments of the present disclosure will now be described in detail with reference to the appended drawings.

First Embodiment

Figure 1:
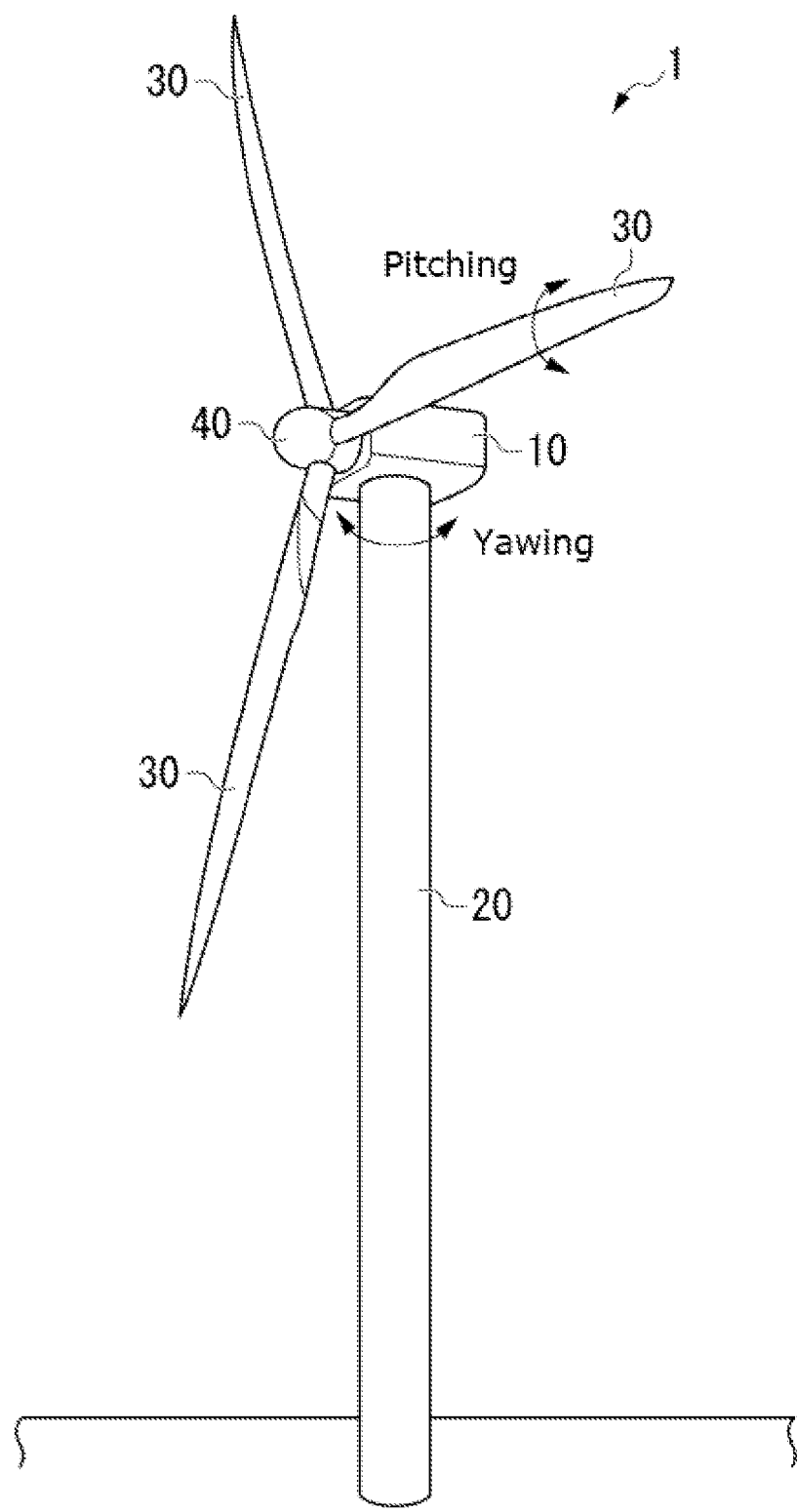
FIG. 1 shows an example configuration of a wind power generation device according to an embodiment of the present invention.

FIG. 1 shows an example configuration of a wind power generation device 1. The wind power generation device 1 includes, for example, a nacelle 10, a tower 20, blades 30, and a hub 40. The tower 20 and nacelle 10 are presented as an example of two structures included in the wind power generation device 1. The tower 20 and nacelle 10 move relative to each other utilizing a force from a yaw drive device. The tower 20 is presented as an example of a first structure. The first structure is a part of the wind power generation device 1 that is fixedly installed on a surface where the wind power generation device 1 is installed (the ground or sea surface). The nacelle 10 is presented as an example of a second structure. The second structure is movable relative to the first structure utilizing drive forces from yaw drive devices. The second structure becomes stationary relative to the first structure when acted upon by a braking force from the yaw drive devices 100.

The nacelle 10 is mounted on the top end (the end in the Z direction) of the tower 20. The blades 30 are mounted to the nacelle 10 via the hub 40. The nacelle 10 turns the blades 30 and hub 40 to adjust their orientation in the yaw direction. The nacelle 10 has a yaw drive mechanism provided therein. The yaw drive mechanism is configured to generate a yaw drive force for causing the nacelle 10 to yaw. A yaw drive device is introduced as an example of a drive device and a wind turbine drive device. The drive device and wind turbine drive device are configured to generate a force for rotating the blades 30 and hub 40 to adjust their orientation (the orientation of the wind turbine) in accordance with the wind direction. The yaw drive device is designed to rotate the blades 30 and hub 40 to adjust their orientation (the orientation of the wind turbine) in accordance with the wind direction. The nacelle 10 is presented as an example of a structure that is designed to receive none of the force generated by the drive device. The tower 20 is presented as an example of a structure that is designed to receive the force generated by the drive device.

The tower 20 is installed on land or offshore. The tower 20 extends upward vertically from the ground or sea surface. The nacelle 10 is mounted on the top end of the tower 20. The tower 20 has a ring gear therein for turning the nacelle 10 in the yaw direction.

The blades 30 are vanes for generating a rotational force when acted upon by a force of wind. In the present embodiment, three blades 30 are provided.

The hub 40 is mounted to the nacelle 10. The blades 30 are mounted to the hub 40. The hub 40 is configured to transmit to a rotatable shaft the rotational force (motive power) generated by the blades 30 when acted upon by a force of wind. The hub 40 transmits to the nacelle 10 the rotational force via the rotatable shaft.

The hub 40 has a pitch drive mechanism provided therein. The pitch drive mechanism is configured to generate a pitch drive force for causing the blades 30 to pitch. Each blade 30 is provided with a pitch drive mechanism. The pitch drive mechanisms cause the blades 30 to pitch at a speed determined by the speed of the wind, to control the angle of the blades 30.

In the wind power generation device 1, the motive power generated by the rotation of the blades 30 is transmitted from the hub 40 to a power generator (not shown) in the nacelle 10. In the wind power generation device 1, the generator converts the motive power into electric power. In this way, the wind power generation device 1 generates power from wind.

Figure 2:
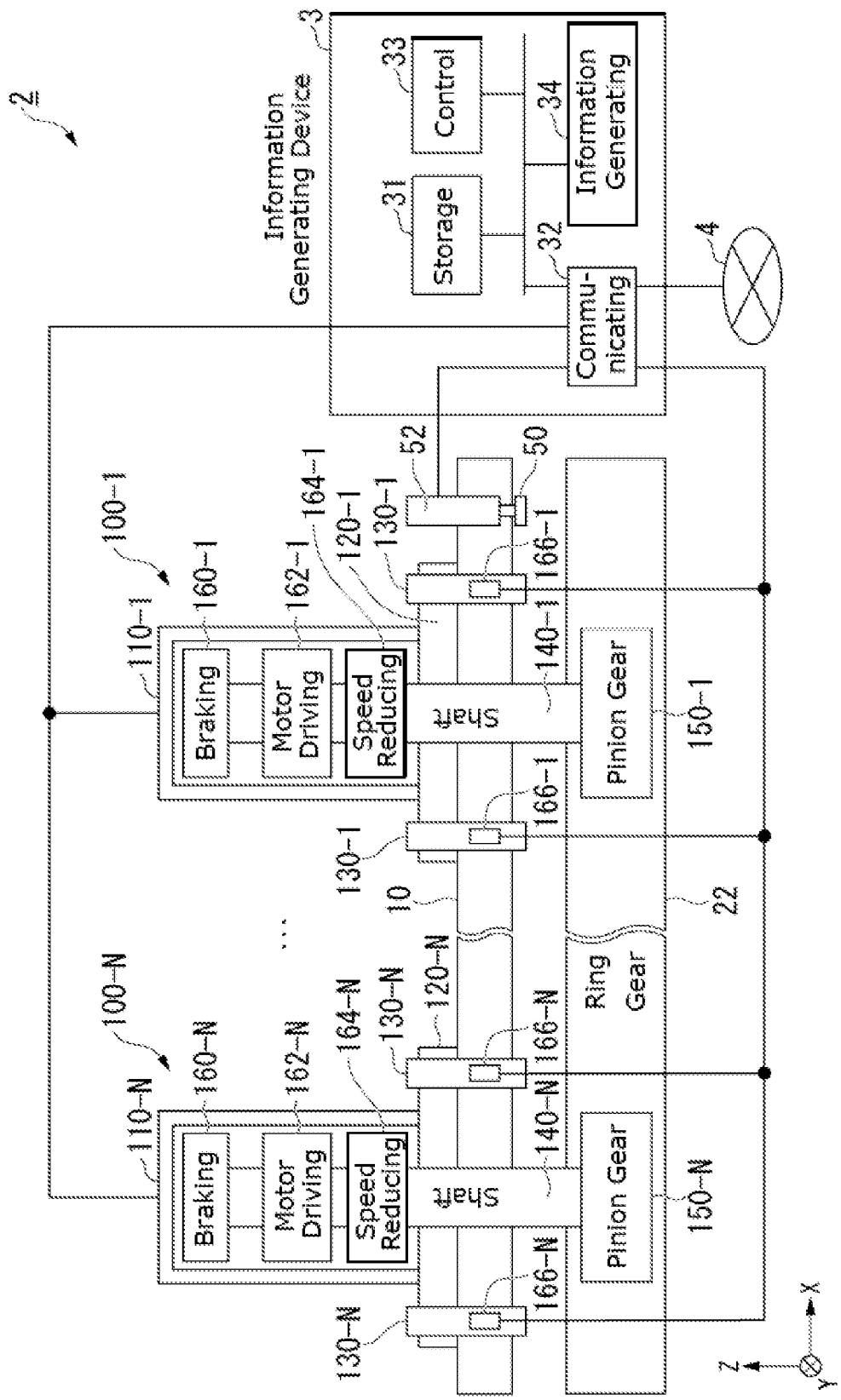
FIG. 2 illustrates an example configuration of an information generating system relating to an embodiment.

The following now describes an example configuration of an information generating system 2. FIG. 2 illustrates an example configuration of the information generating system 2. The information generating system 2 is configured to generate correlation information used for calibration. The information generating system 2 includes yaw drive devices 100-1 to 100-N and an information generating device 3. The information generating device 3 may be connected to a communication line 4. The communication line 4 may be a wired or wireless communication line.

The yaw drive devices 100 for generating a yaw drive force are mounted to the nacelle 10. In the following, N ("N" is an integer greater than or equal to 2) yaw drive devices 100-1 through 100-N are mounted on the nacelle 10. In the following description, the yaw drive devices may be collectively referred to simply as "the yaw drive device 100-N" ("N" is an integer ranging from 1 to N), or as "the yaw drive devices 100." A ring gear 22 is formed in the inner wall of the tower 20. The ring gear 22 meshes with pinion gears 150 of the yaw drive devices 100.

With the ring gear 22 and the pinion gears 150 meshing with each other, a force such as a gust of wind may be applied to the nacelle 10, the tower 20 or the like. In such a case, a tangential force may be generated between the ring gear 22 and the pinion gears 150. The tangential force is generated in the tangential direction of the gear forming surface of the ring gear 22. The tangential force applies a torsional stress to a speed reducing unit 164 of each of the yaw drive devices 100. The tangential force applies tensile and compressive stresses to the clamp (fastening unit) in each of the yaw drive devices 100. In the present embodiment, the ring gear 22 is provided in the tower 20, and the yaw drive devices 100 are fixedly attached to the nacelle 10, but the present embodiment is not limited to such. For example, the nacelle 10 may include a gear portion corresponding to the ring gear 22, and the tower 20 may include yaw drive devices corresponding to the yaw drive devices 100.

The yaw drive devices 100 each include, for example, a casing 110, a flange 120, a fastening bolt 130, an output shaft 140, and a pinion gear 150. The flange 120 is mounted to the casing 110. The flange 120 is connected to the nacelle 10 with the fastening bolt 130. A first end of the output shaft 140 is connected to the interior of the casing 110 and the flange 120. A second end of the output shaft 140 has the pinion gear 150 provided thereon. The pinion gear 150 is positioned so as to mesh with the ring gear 22. The pinion gear 150 is rotatable when acted upon by the drive force (drive torque) output from the output shaft 140. When rotating, the pinion gear 150 causes the yaw drive device 100 to turn in a turn direction (the direction in which the device is movable, or the −X direction). The yaw drive device 100 in turn causes the nacelle 10 to turn in the yaw direction relative to the tower 20. The fastening bolt 130 (fastening unit) is presented as an example of the clamp. The clamp is a constituent element for fixedly attaching the yaw drive device 100 to the nacelle 10. The clamp is not limited to the fastening bolt 130 but may be any of other known members. The output shaft 140 and pinion gear 150 are presented as an example of a transmission unit. The transmission unit is configured to transmit a drive force (drive torque) and a braking force (braking torque) from the yaw drive device 100 to the tower 20. If the drive device is fixedly attached to the tower 20, the transmission unit is configured to transmit the force from the tower 20 to the nacelle 10.

The yaw drive devices 100 each include a braking unit 160, a motor driving unit 162, and a speed reducing unit 164. The braking unit 160 (shaft braking unit) is configured to generate a braking force to be applied to the output shaft 140. The motor driving unit 162 is configured to generate a drive force to be applied to the output shaft 140. The yaw drive device 100 is configured to rotate, together with the nacelle 10, relative to the ring gear 22, when acted upon by the driving force from the motor driving unit 162. The braking unit 160 uses an electromagnetic action to generate a braking force, in response to a control signal fed from outside. The braking unit 160 operates as an electromagnetic brake for generating a braking force. For example, the braking unit 160 is configured not to generate a braking force (electromagnetic braking force) while being fed with a voltage. For example, the braking unit 160 is configured to generate a braking force (electromagnetic braking force) while not being fed with a voltage. The motor driving unit 162 uses an electromagnetic action to generate a driving force, in response to a control signal fed from outside. The speed reducing unit 164 is configured to reduce the rotation speed determined by the driving force generated by the motor driving unit 162, thereby increasing the driving torque.

The yaw drive devices 100 each include a deformation sensor 166. The deformation sensor 166 is presented as an example of a sensing circuit. The deformation sensor 166 (first deformation amount obtaining unit) is configured to detect a value (signal) determined based on the deformation of the columnar portion of the fastening bolt 130. The deformation sensor 166 may detect a value (signal) determined by how much the clamp of the fastening bolt 130 such as a nut is deformed. The deformation of the columnar portion of the fastening bolt 130 depends on the tangential force.

The wind power generation device 1 includes one or more hydraulic brakes (braking units) for applying a braking force to the ring gear 22. The hydraulic brakes are, for example, caliper brake mechanisms. The hydraulic brakes each include a hydraulic brake driving unit 52 and a friction member 50. The hydraulic brake driving unit 52 is configured to move the friction member 50 in the Z direction shown in FIG. 2, in response to a control signal fed from outside. The hydraulic brake driving unit 52 is configured to apply a braking force to the ring gear 22 by pressing the friction member 50 against the ring gear 22. This allows the hydraulic brake driving unit 52 to brake the rotation of the ring gear 22 and the pinion gear 150 relative to each other. In this way, the information generating device 3 can adjust the braking force (hydraulic brake force) applied by the hydraulic brakes to the ring gear 22.

In the first embodiment, the hydraulic brake is released. In other words, the braking force from the hydraulic brake does not act on the ring gear 22 in the first embodiment.

The information generating device 3 includes a storage unit 31, a communicating unit 32, a control unit 33 and an information generating unit 34. Some or all of the functional units of the information generating device 3 are implemented by a processor (computer) such as a central processing unit (CPU) executing a program(s) stored on the storage unit 31. The storage unit 31 is preferably formed of a non-volatile storage medium (non-transitory storage medium) such as a flash memory or a hard disk drive (HDD). The storage unit 31 may include a volatile storage medium such as a random access memory (RAM). Some or all of the functional units of the information generating device 3 may be implemented by using hardware such as a large scale integrated circuit (LSI) or an application specific integrated circuit (ASIC).

The storage unit 31 stores thereon correlation information. The correlation information indicates the correspondence between the amount of deformation experienced by the fastening bolt 130-N (clamp) and the driving or braking torque of the yaw drive device 100-N. The format of the correlation information is not limited to a specific format but can be, for example, a data table.

The communicating unit 32 communicates with each of the yaw drive devices 100. For example, the communicating unit 32 obtains the value of the current fed to the motor driving unit 162-N from the current sensor of the yaw drive device 100-N. The communicating unit 32 may communicate with an external device (not shown) via the communication line 4.

The communicating unit 32 (second deformation amount obtaining unit) communicates with the deformation sensors 166. The communicating unit 32 obtains the amount of deformation experienced by the fastening bolt 130-N from the deformation sensor 166-N.

The control unit 33 controls how the yaw drive devices 100 operate via the communicating unit 32. The control unit 33 controls the hydraulic brake drive unit 52 via the communicating unit 32. As the motor driving unit 162 rotates, the pinion gear 150 meshing with the ring gear 22 rotates. The control unit 33 rotates the motor driving unit 162 while keeping a predetermined braking force applied to brake the rotation of the turnable part of the wind power generation device 1 (wind turbine), such as the ring gear 22 or nacelle 10. In the first embodiment, the predetermined braking force is the electromagnetic braking force generated by the braking unit 160-N (shaft braking unit). The upper limit of the predetermined braking force or driving torque is less than the allowable torque for the weakest one of the stiffness of the ring gear 22 (turnable gear), the stiffness of the pinion gears 150, and the stiffness of the speed reducing units 164 or hydraulic brake driving units 52. For example, if the pinion gear 150 has the weakest stiffness, the upper limit of the predetermined braking force (electromagnetic braking force) is less than the allowable torque of the pinion gears 150, which are configured to be rotated by the motor driving units 162. The control unit 33 determines the braking force based on the allowable torque of the yaw drive device 100 such that the yaw drive device 100 does not break down. In the following, the allowable torque is determined based on the specifications of the speed reducing unit 164 connected to the motor driving unit 162.

The control unit 33 obtains the driving torque of the motor driving unit 162 via the communicating unit 32. For example, the control unit 33 calculates the driving torque of the motor driving unit 162 based on the value of the current fed to the motor driving unit 162.

The information generating unit 34 generates correlation information indicating the correspondence between the driving torque of the motor driving unit 162-N and the amount of deformation of the fastening bolt 130-N. The information generating unit 34 may record the correlation information in the storage unit 31.

Figure 3:
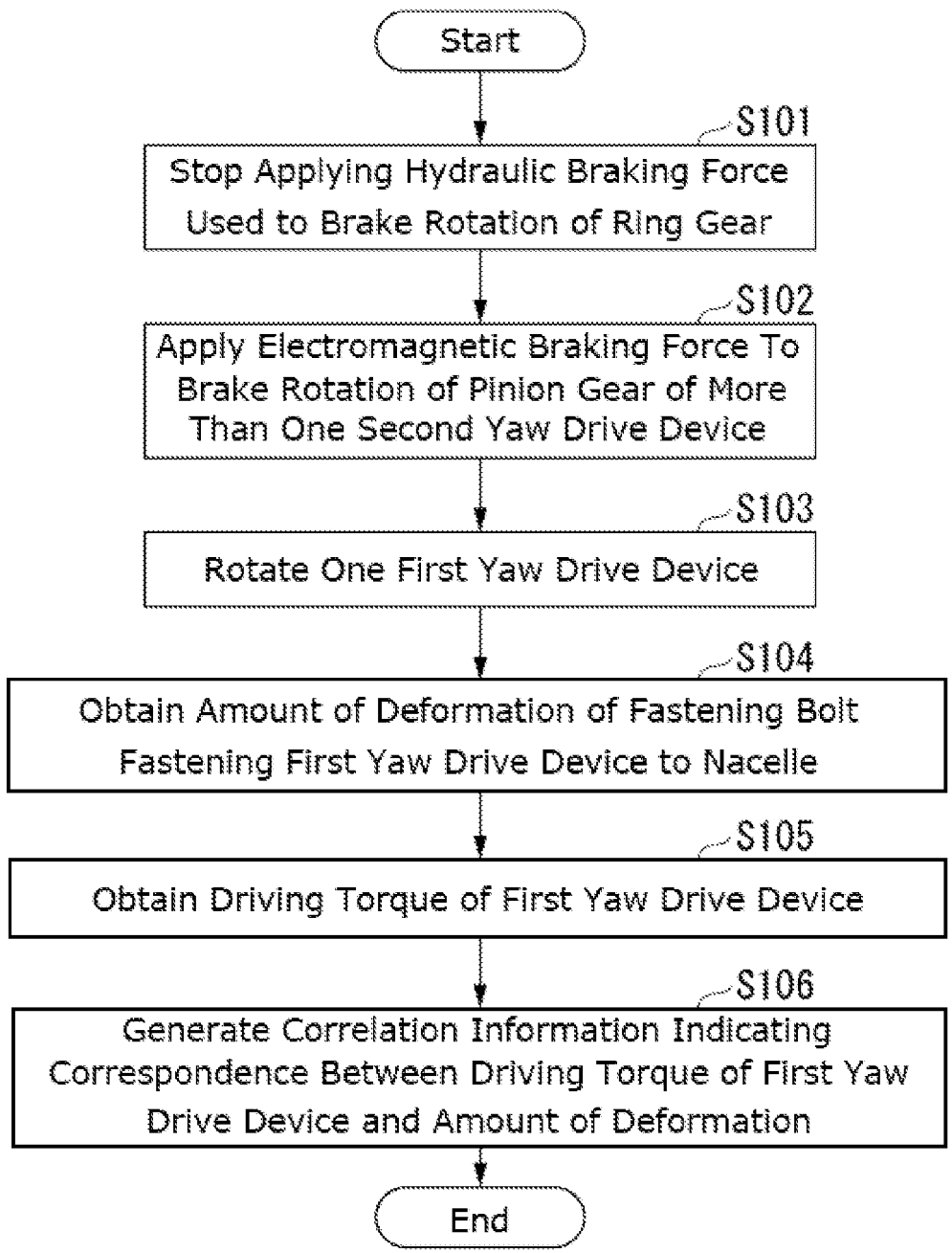
FIG. 3 is a flowchart showing, as an example, how an information generating system relating to a first embodiment operates.

The following now describes, as an example, how the information generating system 2 operates. FIG. 3 is a flowchart showing, as an example, how the information generating system 2 operates. The control unit 33 causes the hydraulic brake driving units 52 (hydraulic brake) to stop applying the hydraulic braking force (frictional braking force) designed to brake the rotation of the ring gear 22 (step S101). The control unit 33 uses the yaw drive devices 100-2 to 100-N (one or more second yaw drive devices) to apply an electromagnetic braking force to brake the rotation of the pinion gears 150-2 to 150-N. The control unit 33 determines how many of the yaw drive devices 100 generate a braking force such that the braking force does not exceed the allowable torque. This causes the electromagnetic braking force to brake the rotation of the ring gear 22 (step S102). The control unit 33 rotates the motor driving unit 162-1 of the yaw drive device 100-1 (first yaw drive device) (step S103).

The communicating unit 32 (second deformation amount obtaining unit) obtains the amount of deformation experienced by the fastening bolt 130-1 from the deformation sensor 166-1 (step S104). The control unit 33 obtains, via the communicating unit 32, the driving torque of the motor driving unit 162-1 (step S105). The information generating unit 34 generates correlation information indicating the correspondence between the driving torque of the motor driving unit 162-1 and the amount of deformation (step S106). The information generating unit 34 may record the correlation information in the storage unit 31. The communicating unit 32 may transmit the correlation information to the communication line 4.

As described above, the control unit 33 causes the motor driving unit 162-1 to rotate while the predetermined braking force (electromagnetic braking force) is being applied to brake the rotation of the turnable unit of the wind power generation device 1 (wind turbine), for example, the nacelle 10 or ring gear 22. In this manner, the control unit 33 causes the fastening bolt 130-1 (clamp) to deform, which is used to fixedly attach the yaw drive device 100-1 to the nacelle 10 (target part). The deformation sensor 166-1 (first deformation amount obtaining unit) and communicating unit 32 (second deformation amount obtaining unit) obtain the amount of deformation experienced by the fastening bolt 130-1. The information generating unit 34 generates the correlation information indicating the correspondence between the driving torque of the motor driving unit 162-1 and the amount of deformation experienced when the driving torque is used to rotate the yaw drive device 100-1.

In this way, the correlation information can be generated remotely, which indicates the correspondence between the amount of deformation experienced by the clamps (fastening units) provided to fixedly attach the yaw drive devices 100 to the nacelle 10 and the driving torque generated the yaw drive devices 100. The first embodiment can reduce a sudden increase in the torque of the output shaft 140, thereby preventing breakage of the yaw drive devices 100 and ring gear 22.

Second Embodiment

The second embodiment differs from the first embodiment in that at least part of the hydraulic braking force (the braking force produced by one or more hydraulic brakes selected based on a predetermined condition from among the one or more hydraulic brakes) is applied by the friction member 50 to the ring gear 22. The following description of the second embodiment will be mainly focused on the difference from the first embodiment.

The control unit 33 causes the motor driving unit 162 to rotate while a predetermined braking force is being applied to brake the rotation of the ring gear 22. In the second embodiment, the predetermined braking force applied to the ring gear 22 is the hydraulic braking force (frictional braking force) generated by the hydraulic brake driving unit 52. The upper limit of the predetermined braking force or driving torque is less than the allowable torque for the weakest one of the stiffness of the ring gear 22 (turnable gear), the stiffness of the pinion gears 150, and the stiffness of the speed reducing units 164 or hydraulic brake driving units 52. For example, if the pinion gear 150 has the weakest stiffness, the upper limit of the predetermined braking force (frictional braking force) is less than the allowable torque of the pinion gears 150, which are configured to be rotated by the motor driving units 162. The control unit 33 determines the braking force based on the allowable torque of the yaw drive device 100 such that the yaw drive device 100 does not break down.

Figure 4:
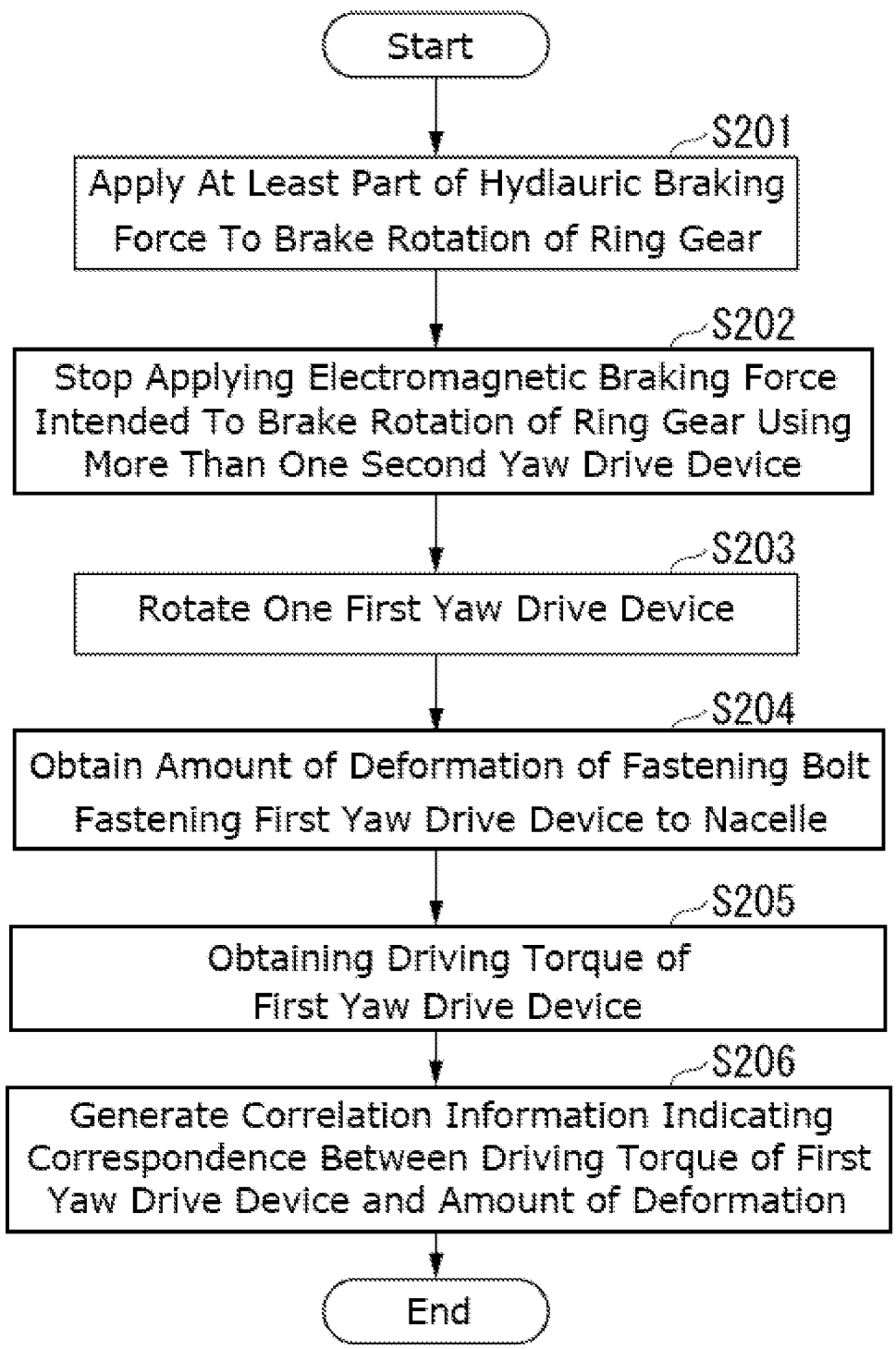
FIG. 4 is a flowchart showing, as an example, how an information generating system relating to a second embodiment operates.

FIG. 4 is a flowchart showing, as an example, how the information generating system 2 operates. The control unit 33 selects one or more hydraulic brake driving units 52 from among the one or more hydraulic brake driving units 52. The control unit 33 uses the selected hydraulic brake driving units 52 to brake the rotation of the ring gear 22. In other words, the control unit 33 uses at least part of the hydraulic brake force to brake the rotation of the ring gear 22 (step S201). The control unit 33 causes the yaw drive devices 100-2 to 100-N to stop applying the electromagnetic braking force (braking torque) of the braking units 160-2 to 160-N (step S202).

The control unit 33 causes the motor driving unit 162-1 to rotate (step S203). The communicating unit 32 obtains the amount of deformation experienced by the fastening bolt 130-1 from the deformation sensor 166-1 (step S204).

The control unit 33 obtains, via the communicating unit 32, the driving torque of the motor driving unit 162-1 (step S205). The information generating unit 34 generates the correlation information indicating the correspondence between the driving torque of the motor driving unit 162-1 and the amount of deformation (step S206). The information generating unit 34 may record the correlation information in the storage unit 31. The communicating unit 32 may transmit the correlation information to the communication line 4.

As described above, the control unit 33 selects one or more hydraulic brake driving units 52 (braking unit) from among one or more hydraulic brake driving units 52. The control unit 33 controls the selected hydraulic brake driving units 52. The information generating unit 34 generates the correlation information indicating the correspondence between the driving torque of the motor driving unit 162-1 and the amount of deformation.

In this way, the correlation information can be generated remotely, which indicates the correspondence between the amount of deformation experienced by the fastening bolts 130 and the driving torque of the yaw drive devices 100.

Third Embodiment

A third embodiment is different from the second embodiment in that the yaw drive devices 100-1 to 100-N rotate the pinion gears 150-1 to 150-N. The following description of the third embodiment will be mainly focused on the differences from the second embodiment.

Figure 5:
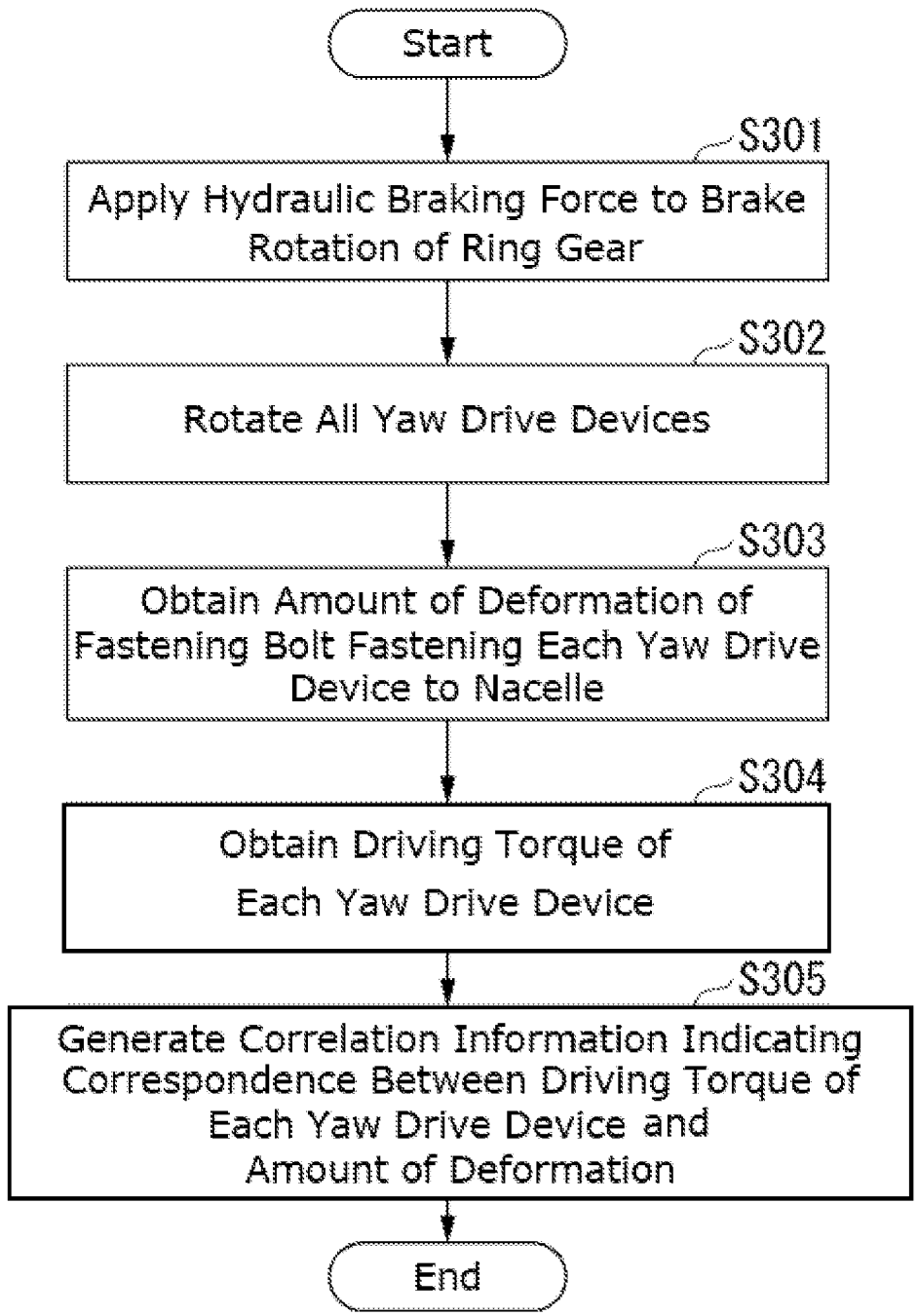
FIG. 5 is a flowchart showing, as an example, how an information generating system relating to a third embodiment operates.

FIG. 5 is a flowchart showing, as an example, how the information generating system 2 operates. The control unit 33 uses the hydraulic brake driving units 52 to apply a hydraulic braking force to brake the rotation of the ring gear 22 (step S301). The control unit 33 causes the motor driving units 162-1 to 162-N to rotate. The upper limit of the hydraulic braking force or driving torque is less than the allowable torque for the weakest one of the stiffness of the pinion gears 150, the stiffness of the ring gears 22 (turnable gear), and the stiffness of the speed reducing units 164 or hydraulic brake driving units 52. For example, if the pinion gears 150 have the weakest stiffness, the upper limit of the hydraulic braking force is less than the allowable torque of the pinion gears 150 (step S302). The communicating unit 32 obtains the amount of deformation experienced by the fastening bolts 130-1 to 130-N of the yaw drive devices 100-1 to 100-N such that the amount of deformation of each yaw drive device 100-N is obtained from the deformation sensor 166-N (step S303).

The control unit 33 obtains, via the communicating unit 32, the driving torque of each of the yaw drive devices 100-1 to 100-N (step S304). The information generating unit 34 generates, for each of the yaw drive devices 100-1 to 100-N, the correlation information indicating the correspondence between the driving torque and the amount of deformation (step S305). The information generating unit 34 may record the correlation information in the storage unit 31. The communicating unit 32 may transmit the correlation information to the communication line 4.

As described above, the control unit 33 controls the hydraulic brake driving units 52 (braking unit). The control unit 33 causes the motor driving units 162-1 to 162-N of the yaw drive devices 100-1 to 100-N to rotate. The information generating unit 34 generates the correlation information indicating the correspondence between the driving torque and the amount of deformation for each of the yaw drive devices 100-1 to 100-N.

In this way, the correlation information can be generated at once for all of the yaw drive devices 100, which indicates the correspondence between the amount of deformation experienced by the fastening bolts 130 and the driving torque of the yaw drive devices 100.

Fourth Embodiment

In a fourth embodiment, the electromagnetic braking force (braking force) of the braking unit 160-1 is used to brake the rotation of the ring gear 22 via the pinion gear 150-1. Furthermore, the fourth embodiment is different from the first embodiment in that correlation information is generated indicating the correspondence between the electromagnetic braking force of the braking unit 160-1 and the amount of deformation of the fastening bolt 130-1. The following description of the fourth embodiment will be mainly focused on the differences from the first embodiment.

The communicating unit 32 communicates with each of the yaw drive devices 100. For example, the communicating unit 32 obtains the value of the current fed to the braking unit 160-N from the current sensor of the yaw drive device 100-N.

The control unit 33 controls the braking units 160. The control unit 33 calculates the driving torque of the braking unit 160-N based on the value of the current fed to the braking unit 160-N. The information generating unit 34 generates correlation information indicating the correspondence between the driving torque of the braking unit 160-N and the amount of deformation of the fastening bolt 130-N.

Figure 6:
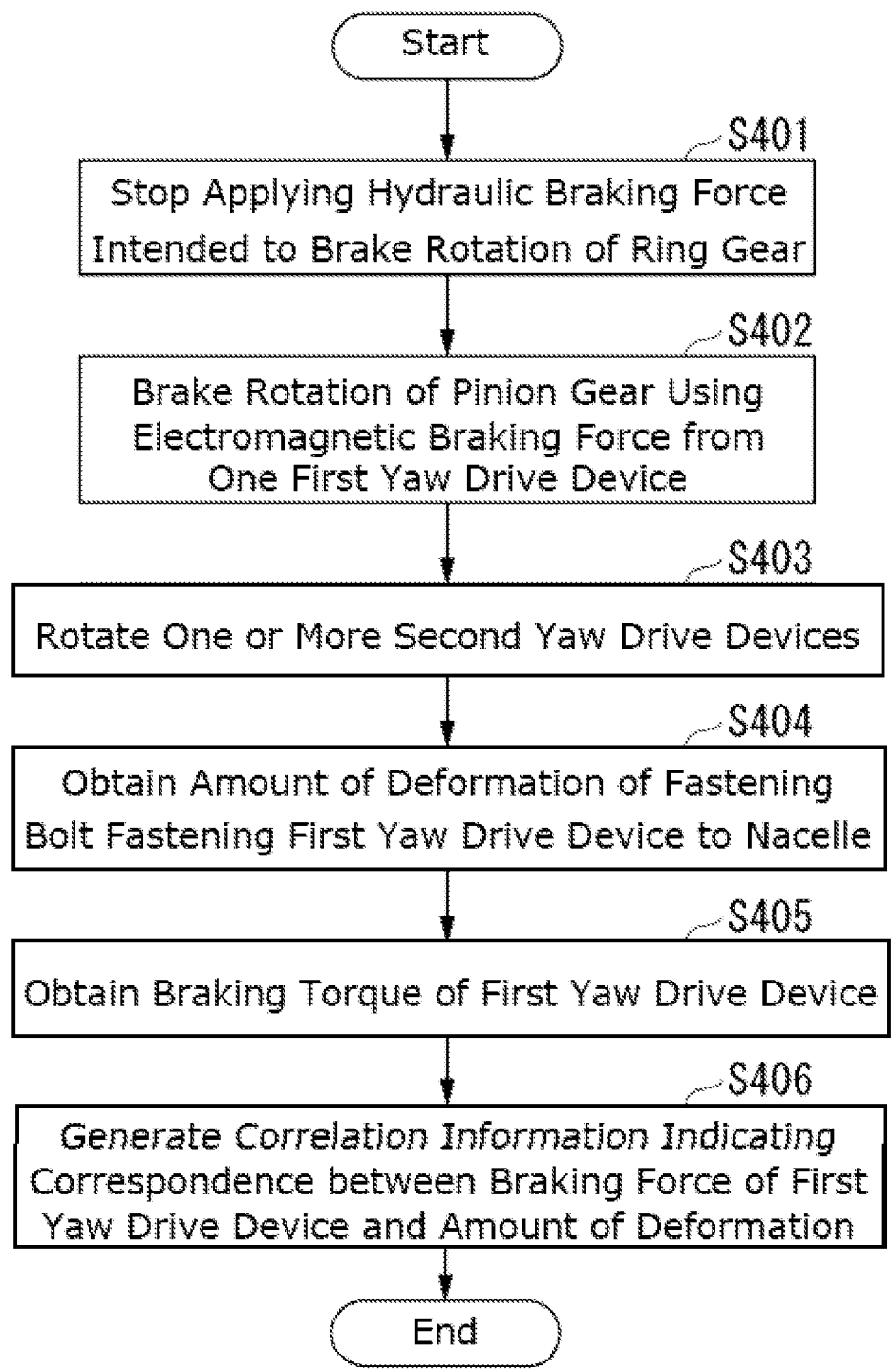
FIG. 6 is a flowchart showing, as an example, how an information generating system relating to a fourth embodiment operates.

FIG. 6 is a flowchart showing, as an example, how the information generating system 2 operates. The control unit 33 causes the hydraulic brake driving units 52 to stop applying the hydraulic braking force designed to brake the rotation of the ring gear 22 (step S401). The control unit 33 uses the yaw drive device 100-1 to apply an electromagnetic braking force to brake the rotation of the pinion gear 150-1 (step S402). The control unit 33 causes the motor driving units 162-2 to 162-N to rotate (step S403).

The communicating unit 32 obtains the amount of deformation experienced by the fastening bolt 130-1 from the deformation sensor 166-1 (step S404). The control unit 33 obtains, via the communicating unit 32, the driving torque of the braking unit 160-1, in place of the driving torque of the motor driving unit 162-1 (step S405). The information generating unit 34 generates the correlation information indicating the correspondence between the driving torque of the braking unit 160-1 and the amount of deformation (step S406). The information generating unit 34 may record the correlation information in the storage unit 31. The communicating unit 32 may transmit the correlation information to the communication line 4.

As described above, the control unit 33 uses the yaw drive device 100-1 to apply an electromagnetic braking force to brake the rotation of the pinion gear 150-1. The control unit 33 causes the motor driving units 162-2 to 162-N of the yaw drive devices 100-2 to 100-N to rotate. The information generating unit 34 generates the correlation information indicating the correspondence between the driving torque of the braking unit 160-1 of the yaw drive device 100-1 and the amount of deformation.

In this way, the correlation information can be generated remotely, which indicates the correspondence between the amount of deformation experienced by the fastening bolts 130 and the driving torque of the yaw drive devices 100.

The foregoing embodiments disclosed herein describe a plurality of physically separate constituent parts. They may be combined into a single part, and any one of them may be divided into a plurality of physically separate constituent parts. Irrespective of whether or not the constituent parts are integrated, they are acceptable as long as they are configured to solve the problems.

According to the foregoing embodiments disclosed herein, a plurality of functions are distributively provided. Some or all of the functions may be integrated. Any one of the functions may be partly or entirely segmented into a plurality of functions, which are distributively provided. Irrespective of whether or not the functions are integrated or distributed, they are acceptable as long as they are configured to solve the problems.

The foregoing is the description of the embodiments of the present invention with reference to the drawings. Specific configurations are not limited to the above embodiments but include design modifications within the purport of the present invention.

What is claimed is:

1. An information generating device comprising:
   at least one memory storing instructions, and
   at least one processor configured to execute the instructions,
   wherein the at least one processor is further configured to:
      cause a motor to rotate a pinion gear meshing with a ring gear while a predetermined braking force is applied to brake rotation of a turnable part of a wind turbine, thereby causing a fastening part to deform, the fastening part being provided to fixedly attach the motor to a target part;
      obtain an amount of deformation experienced by the fastening part; and
      generate correlation information indicating a correspondence between a driving torque of the motor and the amount of deformation experienced when the driving torque is used to rotate the motor.

2. The information generating device of claim 1, wherein the at least one processor is further configured to: in order to brake the turnable part, control a hydraulic brake configured to brake relative rotation of the ring gear and the pinion gear.

3. The information generating device of claim 2, wherein the predetermined braking force is a braking force from the hydraulic brake, and
   wherein, an upper limit of a torque generated in the motor by the braking force from the hydraulic brake is less than an allowable torque for a weakest one of stiffness of the pinion gear, stiffness of the turnable part, and stiffness of a speed reducing unit of the motor.

4. The information generating device of claim 1, wherein a second motor includes an electromagnetic brake configured for braking a rotatable shaft of the second motor, and
   wherein the at least one processor is further configured to: control the electromagnetic brake that is configured to brake the turnable part.

5. The information generating device of claim 4, wherein the predetermined braking force is a braking force from the electromagnetic brake, and
   wherein, an upper limit of a torque generated in the motor by the braking force from the electromagnetic brake is less than an allowable torque for a weakest one of stiffness of the pinion gear, stiffness of the turnable part, and stiffness of a speed reducing unit of the motor.

6. The information generating device of claim 1, wherein the predetermined braking force is a braking force from a first motor, and
   wherein the motor is a second motor.

7. The information generating device of claim 6, wherein an upper limit of the driving torque is less than an allowable torque for a weakest one of stiffness of the pinion gear, stiffness of the turnable part, and stiffness of a speed reducing unit of the second motor.

8. An information generating method comprising steps of:
   causing a motor to rotate a pinion gear meshing with a ring gear while a predetermined braking force is applied to brake rotation of a turnable part of a wind turbine, thereby causing a fastening part to deform, the fastening part being provided to fixedly attach the motor to a target part;
   obtaining an amount of deformation experienced by the fastening part; and
   generating correlation information indicating a correspondence between a driving torque of the motor and the amount of deformation experienced when the driving torque is used to rotate the motor.

9. The information generating method of claim 8, wherein the predetermined braking force is a braking force from a first motor, and
   wherein the motor is a second motor.

10. The information generating method of claim 9, wherein an upper limit of the driving torque is less than an allowable torque of a weakest one of stiffness of the pinion gear, stiffness of the turnable part, and stiffness of a speed reducing unit of the second motor.

11. The information generating method of claim 8, wherein the predetermined braking force is a braking force from a hydraulic brake configured to brake relative rotation of the ring gear and the pinion gear, and wherein, an upper limit of a torque generated in the motor by the braking force from the hydraulic brake is less than an allowable torque for a weakest one of stiffness of the pinion gear, stiffness of the turnable part, and stiffness of a speed reducing unit of the motor.

12. The information generating method of claim 8, wherein the motor is a first motor, wherein the predetermined braking force is a braking force from an electromagnetic brake for braking a rotatable shaft of a second motor, and wherein, an upper limit of a torque generated in the first motor by the braking force from the electromagnetic brake is less than an allowable torque for a weakest one of stiffness of the pinion gear, stiffness of the turnable part, and stiffness of a speed reducing unit of the first motor.

13. A non-transitory computer-readable storage medium storing an information generating program, the information generating program causing a computer to perform procedures of:

causing a motor to rotate a pinion gear meshing with a ring gear while a predetermined braking force is applied to brake rotation of a turnable part of a wind turbine, thereby causing a fastening part to deform, the fastening part being provided to fixedly attach the motor to a target part;

obtaining an amount of deformation experienced by the fastening part; and generating correlation information indicating a correspondence between a driving torque of the motor and the amount of deformation experienced when the driving torque is used to rotate the motor.

14. The non-transitory computer-readable storage medium of claim 13, wherein the predetermined braking force is a braking force from a first motor, and wherein the motor is a second motor.

15. The non-transitory computer-readable storage medium of claim 14, wherein an upper limit of the driving torque is less than an allowable torque for a weakest one of stiffness of the pinion gear, stiffness of the turnable part, and stiffness of a speed reducing unit of the second motor.

16. The non-transitory computer-readable storage medium of claim 13, wherein the predetermined braking force is a braking force from a hydraulic brake configured to brake relative rotation of the ring gear and the pinion gear, and wherein, an upper limit of a torque generated in the motor by the braking force from the hydraulic brake is less than an allowable torque for a weakest one of stiffness of the pinion gear, stiffness of the turnable part, and stiffness of a speed reducing unit of the motor.

17. The non-transitory computer-readable storage medium of claim 13, wherein the motor is a first motor, wherein the predetermined braking force is a braking force from an electromagnetic brake for braking a rotatable shaft of a second motor, and wherein, an upper limit of a torque generated in the first motor by the braking force from the electromagnetic brake is less than an allowable torque for a weakest one of stiffness of the pinion gear, stiffness of the turnable part, and stiffness of a speed reducing unit of the first motor.

\* \* \* \* \*